3,584,364
SPACER FOR SEPARATING DISC BRAKE PADS
George L. Steck, 320 Neal Ave, Dayton, Ohio 45405
Filed Dec. 6, 1968, Ser. No. 781,728
Int. Cl. B23q 7/10
U.S. Cl. 29—212           8 Claims

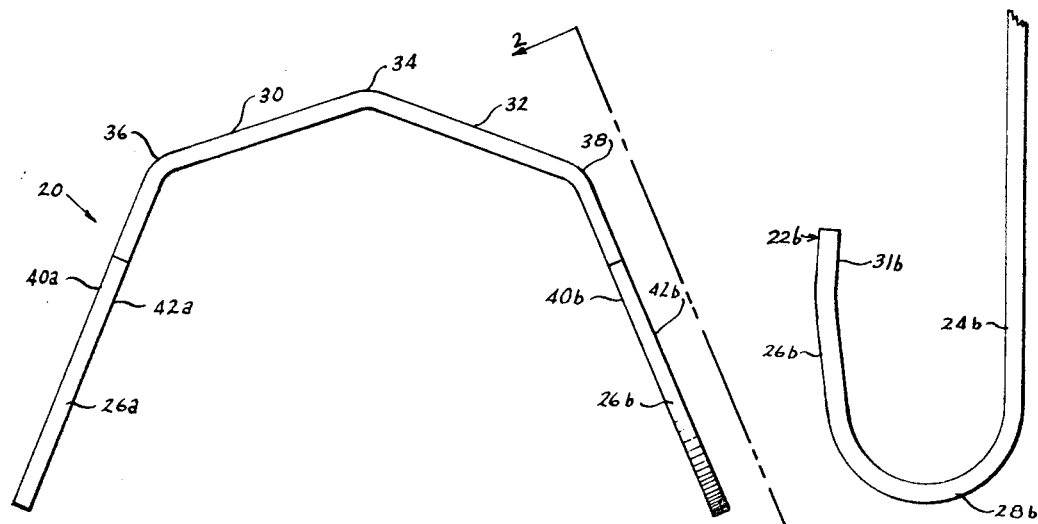
FIG.1
FIG.2
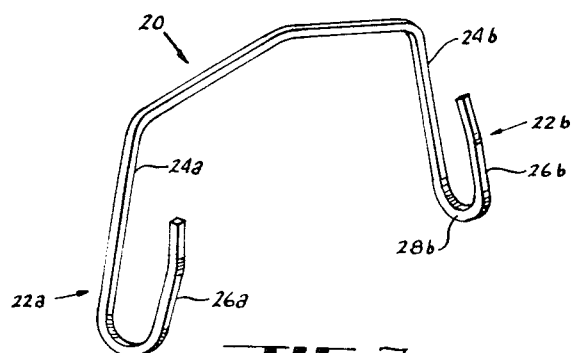
FIG.3
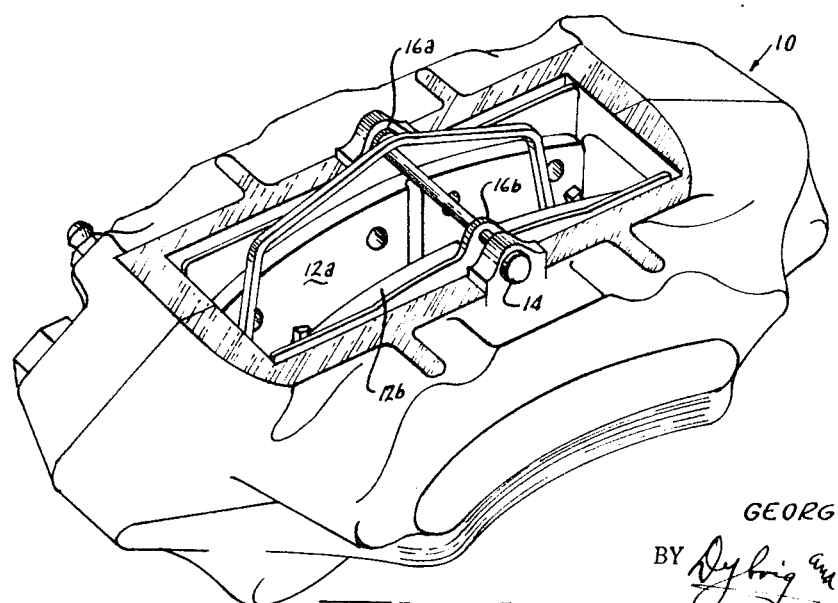
FIG.4
INVENTOR.
GEORGE L. STECK
BY Dybvig and Dybvig
HIS ATTORNEYS United States Patent Office 3,584,364
Patented June 15, 1971

ABSTRACT OF THE DISCLOSURE

A spacer device for separating the brake pads in a disc brake caliper comprises a one-piece rod bent at its opposite ends to form spacers each having the general shape of a hook. The central portion of the rod forms a handle and the spacers extend angularly from the handle so that the spacers, while diverging each from the other with increasing distance from the handle, have generally confronting side surfaces. The hook design allows the spacers to be wedged between the brake pads of a disc brake caliper to hold the brake pads in separated parallel relationship for assembly of the caliper over a brake disc.

---

This invention relates to a spacer for separating the brake pads of a disc brake caliper; however, the invention is not necessarily so limited.

In a typical disc brake assembly, two brake pads are supported by a caliper on opposite sides of a brake disc for engagement with peripheral portions of the brake disc. Braking is accomplished by one or more pistons associated with the caliper which are hydraulically or pneumatically actuated to press the brake pads against the brake disc. From time to time the brake pads need replacement and at less frequent intervals repair or adjustment of the caliper is required. To facilitate replacement of the pads and other repairs or adjustments, the caliper is made easily detachable from the remaining parts of the disc brake assembly.

With some types of calipers, the brake pads easily fall away from the caliper as the caliper is detached from the remainder of the brake assembly. With other types of calipers the brake pads remain loosely attached to the caliper so they will not fall away as the caliper is removed; however, the brake pads are easily dislodged from their normal operating position and this renders re-attachment of the caliper to the remaining disc brake assembly difficult.

An object of the present assembly is to provide a new and improved spacer device for positioning the brake pads of a disc brake caliper.

Another object of the present invention is to provide a new and improved spacer device for disc brake pads which facilitates both the detachment and the re-attachment of the disc brake caliper.

Still another object of the present invention is to provide a new and improved spacer device of one-piece construction.

Other objects and advantages reside in the construction of parts, the combination thereof, and mode of operation, as will become more apparent from the following description.

In the drawing, FIG. 1 is a side elevation view of a spacer device embodying the present invention.

FIG. 2 is a fragmentary end elevation view of the spacer device taken substantially in the direction of the arrows 2—2 of FIG. 1.

FIG. 3 is a perspective view drawn to reduced scale illustrating the spacer device of FIG. 1.

FIG. 4 is a perspective view illustrating a disc brake caliper having the spacer device of the present invention assembled therein.

Referring to the drawing in greater detail, the spacer device of the present invention is designated by the reference number 20, and comprises a one-piece wire or rod having a uniform rectangular or square cross section. The opposite ends of the rod are each formed to a hook-like shape to provide spacers designated 22a and 22b. The spacer 22b is illustrated in enlarged detail in FIG. 2.

The spacers 22a and 22b, being mirror images one of the other, have corresponding structural features identified by the same reference numbers but with the suffix a designating features of the spacer 22a and the suffix b designating features of the spacer 22b.

Referring in particular to the spacer 22b, the spacer comprises a rear leg 24b analogous to the shank portion of a hook, and a front leg 26b which is supported in spaced juxtaposed relation to the rear leg by a bight portion 28b forming an arch connecting one end of the leg 24b to one end of the leg 26b. The leg 26b terminates with a foot portion 31b turned toward the leg 24b.

As apparent in FIG. 2, the legs 24b and 26b are axially straight and diverge slightly one from the other with increasing distance from the bight portion 28b.

As best appears in FIG. 3, the spacers 22a and 22b are formed by curving the rectangular rod in directions perpendicular to diametrically opposite side faces of the rod. As a result, the spacers each have opposite side surfaces which are planar and parallel. For convenience, the opposite side surfaces of the spacer 22a are designated by the reference characters 40a and 42a in FIG. 1. Correspondingly, the opposite side surfaces of the spacer 22b are designated by the reference characters 40b and 42b in FIG. 1.

The central portion of the one-piece rod from which the spacers 22a and 22b have been formed serves as a handle supporting the spacers 22a and 22b in spaced generally confronting relation. The handle comprises two axially straight portions 30 and 32 supported at an obtuse angle by a bend 34 therebetween. For reasons to be made more apparent in the following. the direction of the bend 34 is such as to cause the handle to arch away from the region between the spacers 22a and 22b.

The straight portion 30 of the handle terminates with a bend 36 integrally connecting the spacer 22a to the handle. Correspondingly, the straight portion 32 of the handle terminates with a bend 38 integrally connecting the spacer 22b to the handle. For convenience, an imaginary straight line connecting the bends 36 and 38 is herein referred to as the longitudinal axis for the handle.

Referring particularly to FIG. 1, it can be noted that the planes defined by the side surfaces of the spacers 22a and 22b project angularly from the longitudinal axis of the handle in such fashion that the spacers 22a and 22b diverge with increasing distance from the handle.

The various reasons for the described structural features of the spacer device become apparent when the spacer device is considered in reference to its operating environment. FIG. 4 schematically illustrates a caliper 10 for a disc brake assembly. The caliper has been removed from other portions of the disc brake assembly and accordingly the brake disc and other elements of the assembly do not appear in FIG. 4.

Supported in the caliper are brake pads 12a and 12b which, upon assembly of the caliper over the brake disc, engage opposite side surfaces of the brake disc. The brake disc thus projects upwardly into the caliper and between the brake pads. The brake pads 12a and 12b have apertured ears 16a and 16b, respectively, which, by receiving a bolt 14 affixed to the caliper 10, hang the brake pads within the caliper 10.

Not appearing in FIG. 4 are pistons disposed in the opposite side walls of the caliper 10 which, upon receipt of a suitable fluid under pressure, press the brake pads 12a and 12b against the outer periphery of the brake disc. Typical disc brake constructions have a spring bias on the pistons which acts to urge the brake pads lightly against the outer periphery of the brake disc. When the caliper is removed, the spring bias on the pistons operates to advance the brake pads one toward the other. This places the brake pads too close together to receive the brake disc therebetween and may cock the brake pads away from parallelism. Re-assembly of the caliper over the brake disc is accordingly rendered difficult by reason of the fact that the brake pads are not appropriately spaced to receive the brake disc.

This difficulty can be avoided with the present invention by placing the spacer device 20 over the caliper after loosening the bolts which secure the caliper and before removing the caliper from its position over the brake disc. As the caliper is then lifted from the brake disc, the bight ends of the spacers 22a and 22b are pushed by thumb pressure on the handle portions 30 and 32 into the space between the brake pads 12a and 12b. As the spacers are advanced between the brake pads, the front and rear legs of the spacers are compressed one toward another due to the limited space between the brake pads, as established by the dimensions of the caliper. The front and rear legs of the spacers are thus moved to substantial parallelism, generating a restoring force which tends to keep the brake pads in parallel relation. This minimizes the possibility of the brake pads becoming cocked out of parallelism.

Due to the nonparallel or divergent relationship between the spacers 22a and 22b, the spacers fit close to the outer periphery of the brake disc and quickly replace the brake disc as the caliper is lifted. Thus, as the caliper is lifted, the spacers enter between the brake pads before the pads have an opportunity to become cocked. The upward arch in the handle provided by the bend 34 provides clearance for the bolt 14, thus allowing maximum penetration of the spacers between the brake pads.

At this point in the disassembly, the spacer device holds the brake pads firmly in position and in a separated relation so that the caliper can be easily and effortlessly returned to its position overlying the brake disc. Should the occasion for removal of the caliper be for replacement of the brake pads or repair to the aforementioned cylinders which actuate the brake pads, the spacer device 20 can be easily withdrawn from the caliper so that, by removal of the bolt 14, the brake pads can be replaced. Then, before the caliper is re-assembled over the braking disc, the spacer device is reinserted between the new brake pads to prepare the caliper for effortless re-assembly over the brake disc. In the ordinary case, the new brake pads will be somewhat thicker than the brake pads removed. The angular relationship between the front and rear legs of the spacers and the resiliency therebetween established by the bight portions 28a and 28b of the spacers readily accommodate this increased thickness.

When it is desired to return the caliper to its position overlying the brake disc, the spacer device holds the brake pads 12a and 12b at a sufficient separation that the brake disc is readily received between the brake pads. As the brake disc enters the region between the brake pads, it engages the bight portions 28a and 28b of the spacer device and, as the caliper is lowered into position over the brake disc, the spacer device readily slides upwardly to admit the brake disc between the brake pads. This sliding movement of the spacer device occurs without abrasion or other damage to the brake pads because the smooth surfaces of the spacers which contact the brake pads slide freely without scoring the brake pads.

Having thus described my invention, I claim:

1. A device for separating the brake pads of a disc brake caliper comprising an elongate handle, first and second spacers depending from the opposite ends of said handle, an imaginary straight line joining said opposite ends of said handle defining a longitudinal axis of said handle, said spacers each having a rear leg attached to one of said ends of said handle, each said spacer having a front leg and means supporting said front leg in spaced generally juxtaposed relation to said rear leg, said front and rear legs of each spacer being spaced apart in a direction transverse to said longitudinal axis, said handle and said spacers being integral parts of a one-piece rod element having a uniform cross section.

2. The device of claim 1 wherein said front and rear legs and said supporting means of each spacer have a side surface, said side surfaces of each spacer occupying a common plane disposed at a substantial angle to said longituidnal axis, said common planes of said spacers confronting one another and diverging with increasing distance from said longitudinal axis in the direction of dependency of said spacers.

3. The device of claim 1 wherein said supporting means of each said spacer comprises a resilient arch integral with each of said front and rear legs.

4. The device of claim 3 wherein said rear leg extends in a first direction from said handle to said arch and said front leg extends in the opposite direction from said arch generally toward said handle, said front and rear legs diverging with increasing distance from said arch.

5. The device of claim 1 wherein said handle has a bend therein causing said handle to arch away from the region between said spacers.

6. A device for separating the brake pads of a disc brake caliper comprising: a one-piece rod element of uniform cross section having its opposite ends formed into spacers having the shape of a hook, the central portion of said rod element between said spacers comprising a handle, each said spacer comprising a rear leg depending from said handle, a front leg in spaced juxtaposed relation to said rear leg, and a bight portion connected between said front and rear legs, said spacers having side surfaces disposed in generally confronting relation and diverging each from the other with increasing distance from said handle.

7. The combination including a disc brake caliper having brake pads for engagement with a brake disc and a spacer device to separate said brake pads on disengaging said caliper from said brake disc, said spacer device comprising an elongate handle and first and second spacers depending from opposite ends of said handle, said spacers each having a rear leg attached to one end of said handle, each said spacer having a front leg and means supporting said front leg in spaced generally juxtaposed relation to said rear leg, said front and rear legs of each spacer being spaced apart in a direction transverse to said handle, said spacers adapted to enter between the brake pads of said caliper.

8. The combination of claim 7 wherein said handle and said spacers are integral parts of a one-piece rod element having a uniform cross section.

References Cited

UNITED STATES PATENTS 2,455,557   12/1948   Burner _____ 29—212

HARRISON L. HINSON, Primary Examiner